United States Patent
Chun et al.

[11] 3,818,373
[45] June 18, 1974

[54] SINGLE POCKELS CELL DOUBLE PULSING SCHEME

[75] Inventors: Myung K. Chun, Binghamton, N.Y.; John T. Bischoff, Blackfoot, Idaho

[73] Assignee: General Electric Company, Wilmington, Mass.

[22] Filed: Jan. 8, 1973

[21] Appl. No.: 322,008

[52] U.S. Cl. .......................................... 331/94.5 Q
[51] Int. Cl. ............................................. H01s 3/11
[58] Field of Search ..................... 331/94.5; 350/160

[56] References Cited
OTHER PUBLICATIONS

Fourney et al., Aerosol Size and Velocity Determination via Holography, Rev. Sci. Instr. Vol. 40, No. 2 (Feb. 1969) pp. 205–213.

*Primary Examiner*—William L. Sikes
*Attorney, Agent, or Firm*—I. David Blumenfeld

[57] ABSTRACT

A Q-switched laser is described which can produce multiple light output pulses during each pumping interval. Thus, two output pulses from a single laser rod may be produced with a time separation variable from less than 100 nanoseconds to several hundred microseconds. This novel Q-switched laser includes a neodymium:YAG laser rod positioned in an optical cavity along with a linear polarizer and an electro-optical light polarizing element such as a lithium niobate Pockels Cell. A biasing voltage network is associated with the Pockels Cell which alters the light polarization sufficiently to prevent lasing. The network initially applies a voltage of one polarity across the Pockels Cell. When the initial lasing pulse is desired the voltage is reversed driving it through zero resulting in the emission of a first lasing pulse. Reversal of the bias voltage on the Pockels Cell again alters the polarization of the light passing through the Pockels Cell sufficiently to terminate lasing action. At a later time, the reverse voltage across the Pockels Cell is removed producing a second output light pulse. In a preferred embodiment a pair of R-C circuits are charged to different voltage levels with the voltages applied differentially across the Cell. The R-C circuit having the larger voltage is then discharged. As a result, the bias voltage across the cell is effectively reversed driving the voltage across the Cell through zero. When the cell bias voltage goes through zero, the Q of the cavity is raised sufficiently to produce lasing and a first light output pulse. Thereafter, the second R-C circuit is discharged again driving the cell voltage through zero and generating a second light output pulse.

8 Claims, 8 Drawing Figures

SINGLE POCKELS CELL DOUBLE PULSING SCHEME

This invention relates generally to laser devices and more particularly, to a Q-switched laser characterized by a bias voltage network for controlling the electro-optical Q-switching element to produce a plurality of discrete output light pulses from the laser during a single pumping interval.

Lasing of a Q-switched laser is controlled by introducing losses into the laser cavity to reduce the Q of the cavity. Voltage controlled electro-optical polarizing elements such as Pockels or Kerr Cells are the control elements customarily used to control the cavity Q. By changing the bias voltage on the electro-optical cell the losses are reduced and the Q raised sufficiently to produce lasing and an output light pulse. Typically, such Q-switched lasers produce a single light pulse each time the laser is pumped and for most applications, such a single pulse system is perfectly adequate. For some applications, however, there may be a need for multiple light pulses with either variable or constant spacing. In the past, multiple laser light pulses have been produced by using a plurality of synchronized lasers. Obviously, a two laser system increases the cost and the need for synchronizing the lasers increases the system complexity as well.

It is therefore, an objective of the invention to provide a Q-switched laser which is capable of producing a plurality of discrete pulses from a single laser.

Another prior art approach to producing multiple light outputs, while involving only a single laser, requires multiple pumping and is cumbersome and complex. This approach, as exemplified by U.S. Pat. No. 3,515,938 does not use Q-switching, but instead relies on multiple pumping of the laser rod to produce a plurality of outputs. In this arrangement, the flash lamp for pumping the laser is controlled by two separate power supplies to permit multiple pulsing of the flash lamp. The flash lamp is initially triggered to produce pumping of the laser medium thereby resulting in the stimulated emission of coherent light. After the flash lamp is turned off terminating pumping of the laser, a second pulse forming network triggers the flash lamp again to produce a second pumping of the lower medium to produce another light output. It is obvious that such an arrangement not only requires two power supplies and two pulse forming networks but is incapable of producing closely spaced light pulses of short duration.

It is therefore a further objective of this invention to provide a Q-switched laser capable of producing a plurality of discrete output light pulses during one pumping interval through multiple Q-switching.

Yet another objective of the invention is to provide a Q-switched laser capable of producing two discrete light pulses separable by a variable delay time which utilizes but a single Q-switching electro-optical element.

Other objectives and advantages of the instant invention will become apparent as the description thereof proceeds.

The various advantages and objectives of the instant invention are achieved by means of a Q-switched laser having a Pockels Cell positioned in the optical cavity which is initially biased to retard the phase of the light by $\pi/4$ radians. The total phase retardation as the light passes through the cell in both directions thus rotates the polarization of the light by 90° and thereby introduces sufficient loss into the optical cavity to prevent lasing. The cell bias voltage is provided by a pair of R-C circuits which generate two separate voltages of the same polarity but different amplitudes. These voltages are applied differentially to the electrodes of the Pockels Cell so that the biasing voltage across the cell is equal to the difference in amplitude. One of the R-C circuits is discharged removing the larger voltage and thereby reversing the biasing voltage across the cell. During this reversal the voltage across the cell goes through zero changing the light polarization sufficiently to raise the Q of the cavity and produce an output light pulse. The voltage from the other R-C circuit which is connected to the other cell electrode now biases the cell to rotate the light polarization so as to terminate lasing. Discharge of the second R-C circuit again drives the voltage across the Pockels Cell to zero rotating the polarization of the light so as to raise the Q of the cavity and produce a second output light pulse.

The novel features which are believed to be characteristic of the invention are set forth with particularity in the appended claims. The invention itself, however, both as to its organization and method of operation, as well as additional objects and advantages thereof, will best be understood from the following description when taken in connection with the accompanying drawings in which:

Figure 1:
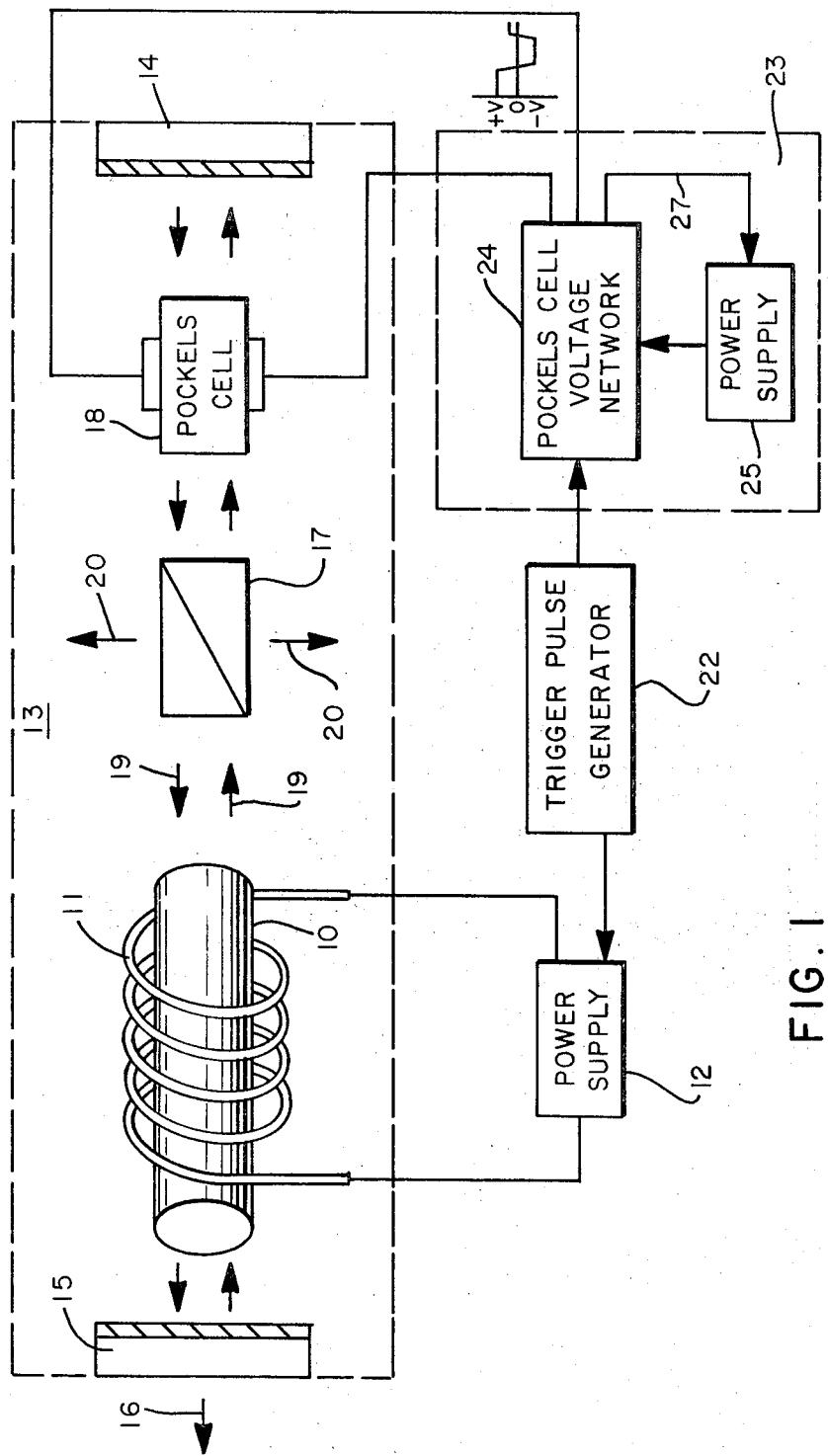
FIG. 1 is a schematic representation of a laser assembly and a block diagram of the circuitry for energizing the laser flash lamp and supplying the bias voltages for the Pockels Cell associated with the laser.

FIG. 1 illustrates a Q-switched laser embodying the instant invention in which two discrete output light pulses are generated during a single pumping interval of the laser. The laser assembly includes a laserable material 10 which is shown in the form of a solid rod. The rod may be any laserable material capable of being pumped and, in a preferred embodiment is a neodymium material which may be embedded in a glass or in YAG, that is, a ytrium-aluminum-garnet matrix. The neodymium laserable material is preferred where high power operation is intended. The glass or YAG serves as a matrix in which the neodymium is embedded. A helical Xenon flash lamp 11 energized from a power supply 12 surrounds laser rod 10 and is used to pump the laser material to a condition of stimulated emission. Alternatively a linear flash lamp may be utilized with equal facility.

The laser rod is disposed in an optical cavity 13 formed by a pair of mirrors 14 and 15 positioned at opposite ends of the cavity. The reflectivity of the mirrors is controlled by coating their surfaces with layers of dielectric material. One of the mirrors, mirror 14 is substantially completely reflective by coating it with dielectric material so that its reflectivity is on the order of 99 percent or greater. The other mirror 15 is only partially reflective, with a reflectivity of 50 percent or so, so that a light beam, shown diagrammatically by arrow 16, is emitted from mirror 15 whenever the system is lasing.

In order to provide pulsed light emission from the laser, Q-switching is utilized. Q-switched lasers are quite well known in the art. However, to summarize briefly, the light losses in the cavity are controlled by means of a linear polarizer and an electro-optical element such as a Pockels Cell so that the losses are normally high and the Q of the cavity is low. In other words, a bias voltage is applied to an electro-optical cell such as a Pockels Cell to establish an electric field which alters the polarization of the light passing through the cell. The amount of polarization is such as to prevent passage of the light through the linear polarizer. The light in the cavity is thus attenuated sufficiently to prevent lasing. When the voltage of the Pockels Cell is switched the Q of the cavity is raised and lasing occurs.

In order to provide this Q-switching, two light controlling components are positioned in the optical cavity. These light controlling components include a linear light polarizer 17 which may be of any conventional construction and is characterized by the fact that incident light of a given polarization, as for example, vertical polarization is passed unaffected along the axis of the cavity as shown by the arrows 19 for example. Light which is not so polarized, i.e., horizontally polarized light, for example, is directed away from the axis of the cavity as shown by the arrows 20 resulting in an attenuation of the light passing along the axis of the optical cavity. Polarization of the light is controlled by an electro-optical element 18 which has the property of altering the polarization of an incident light wave in accordance with the applied voltage. This is due to a differential retardation of the ordinary and extraordinary light rays passing through under the influence of an electric field produced by the applied voltage thereby rotating the polarization of the light. The electro-optical element preferably consists of a Pockels Cell having an active crystal such as lithium niobate ($LiNbO_3$) although other suitable materials such as potassium, dihydrogen phosphate (commonly referred to as KDP) having the formula $KH_2PO_4$ or potassium dideuterium phosphate which has the formula $KD_2PO_4$ may be used as well as Kerr Cells or the like.

Operation of the laser to produce multiple light pulses for each laser pumping interval is initiated from a trigger pulse generator 22 which controls both pumping of laser rod 10 and Q-switching of the laser through Pockels Cell Network 23. Pulse generator 22 initiates operation by applying a trigger pulse to lamp power supply 12 which energizes flash lamp 11. The trigger pulse is also applied to Pockels Cell 18 and consequently also controls, the Q-switching of the laser.

Network 23 includes a bias voltage circuit 24 and power supply 25. The biasing voltage for Pockels Cell 18 is supplied from network 24 and is reversed twice during each laser pumping interval to produce two light pulses from the laser. Each time the bias voltage is reversed, the voltage across Pockels Cell 18 goes through zero at which time the Q of the cavity is raised sufficiently to permit lasing thereby resulting in a light pulse of short duration.

In a preferred embodiment, which will be described in greater detail below in connection with the description of FIG. 2, the Pockels Cell bias voltage circuit includes a pair of R-C circuits which are charged to different voltage levels. These two voltages are applied differentially to the elctrodes of the Pockels Cell and thereby initially apply a biasing voltage of a given polarity to the cells. At a given time interval after the initial triggering pulse is received (an interval which may be varied to control the spacing between the two output light pulses from the laser) the R-C networks which is charged to the higher of the two voltages is discharged. This reverses the voltage across the cell and in the process the cell voltage goes through zero. As the voltage across the Pockels Cell goes to zero, there is undeviated transmission of the light through Pockels Cell 18, i.e., without rotating the light polarization. The polarization of the light is now such that it passes through linear polarizer 17 with attenuation permitting lasing action to take place and producing an output pulse from partially transmitting mirror 15. However, as the voltage goes through zero, and reverses, the bias voltage across the Pockels Cell once again rotates the polarization of light passing through the cell by approximately 90° raising the losses in linear polarizer 17 and reducing the Q of the cavity sufficiently to terminate lasing. At some time after the first lasing pulse, and preferably subsequent to termination of the laser pumping interval, the second R-C circuit is discharged driving the bias voltage to zero. This again results in undeviated transmission of the light and raises the Q of the cavity sufficiently to produce a second light output pulse, while at the same time, "dumping" the remaining light energy in the cavity.

Discharge of the second R-C circuit, as pointed out above, occurs after termination of the flash lamp pulse so that the second output pulse from the laser "dumps" or discharges all of the remaining light energy in the laser cavity. Discharge of the first R-C circuit may, however, be varied to control the spacing between the two lower output pulses, provided that it is delayed sufficiently to permit the buildup of light energy within the cavity to a sufficient level to permit lasing. That is, since the buildup of light within the cavity is a time dependent gain, i.e., there is a delay between the buildup of the flash lamp pulse to its peak and the corresponding buildup of the energy in the cavity, it is obvious that discharge of the first R-C circuit must be delayed at least until the energy density in the cavity has built up sufficiently to permit lasing.

Since reversal of the biasing voltages across the Pockels Cells depends on the discharge of an R-C circuit, network 23 also includes a means for disabling the power supply 25 after the discharge of the first R-C circuit to prevent it from recharging until the second R-C circuit has been discharged and all lasing action has terminated. It will be apparent, that once discharged, the first R-C circuit must remain discharged until the entire cycle is completed. Otherwise, the first network would start recharging thereby reducing the bias voltage across the cell and interfering with proper operation of the laser. To this end, a disabling signal is applied over lead 27 to the power supply whenever the first R-C circuit has been discharged thereby removing the supply voltage to network 24 and preventing recharging of the R-C circuits. When the second light pulse is emitted from the laser, power supply 25 is again enabled to condition the system for the next operating cycle.

Figure 2:
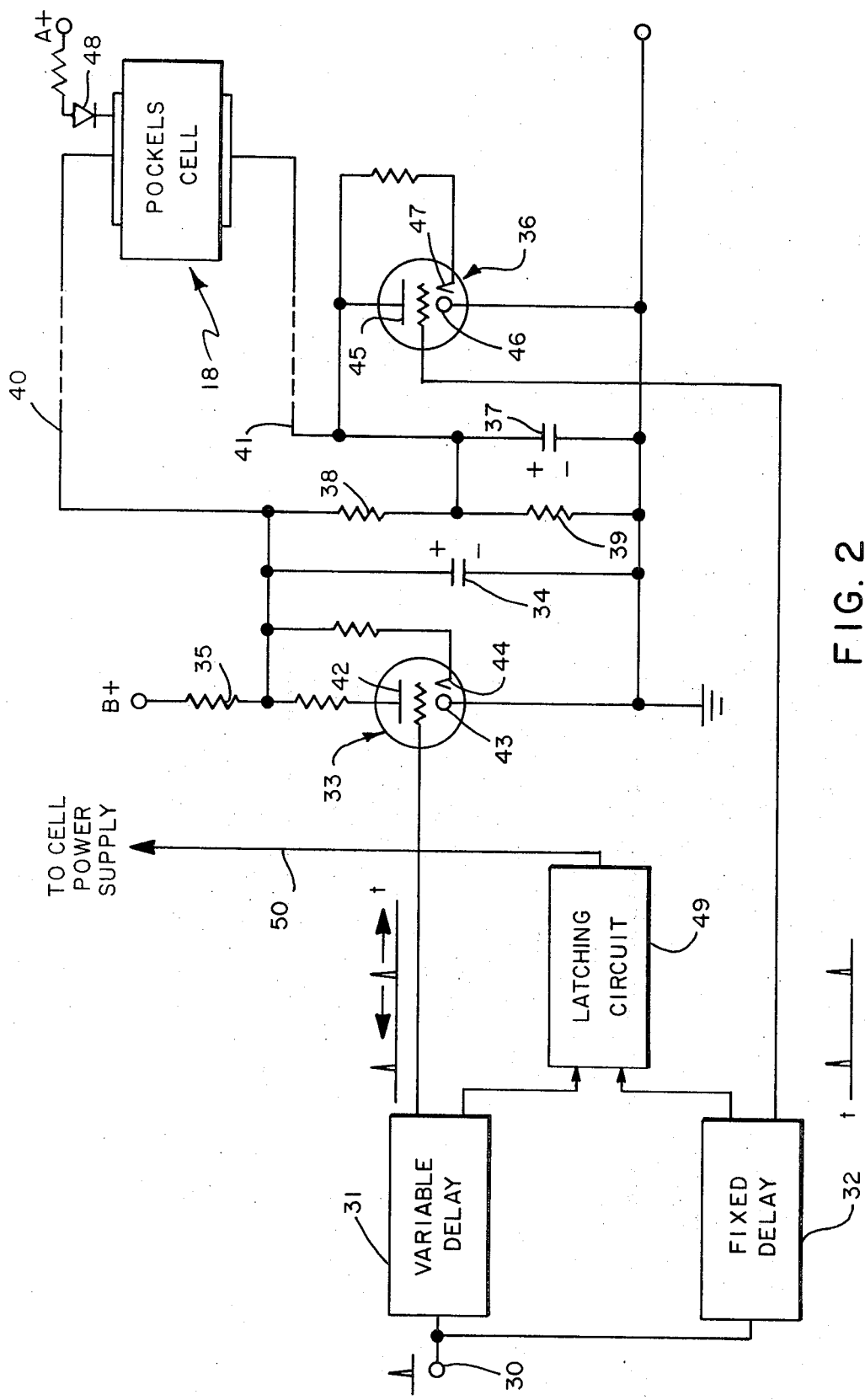
FIG. 2 is a schematic diagram of the circuits utilized for generating the biasing voltages for the Pockels Cell.

FIG. 2 shows a preferred embodiment of the Pockels Cells bias voltage network 24 of FIG. 1 including a pair of R-C storage circuits for producing the bias voltages applied to the Pockels Cells. The R-C circuits are controlled by a pair of cold cathode gas switching tubes which selectively discharge the storage capacitors to reverse the voltage across the Pockels Cells and produce the desired pulsing of the laser. Thus, the trigger pulse generator 22, which also initiates pulsing of the laser flash lamp, is applied to an input terminal 30. Input terminal 30 is connected to a variable pulse delay circuit 31 and a fixed pulse delay circuit 32. Pulse delay circuits 31 and 32 may be of any suitable configuration to produce a time delayed output pulse in response to an input pulse. The output from variable delay circuit 31 is connected to the control electrode of a gas switching tube 33 which may, for example, be a Krytron cold cathode switching tube commercially available under the designation KN–22. Switching tube 33 controls the discharge of a first R-C circuit consisting of a storage capacitor 34 and a charging resistor 35 connected to the positive terminal B+ of the network power supply. Tube 33 has its anode-cathode path connected across capacitor 34 and discharges the capacitor when driven into conduction by the delayed trigger pulse from delay circuit 31.

The output from the fixed delay circuit 32, on the other hand, is connected to the control grid of a similar gas switching tube 36 connected to discharge the storage capacitor of a second R-C network consisting of a capacitor 37 and a voltage divider network 38 and 39 connected in shunt with capacitor 34. The time delay provided by time delay circuits 31 and 32 are such that the time delay produced by fixed delay circuit 32 always exceeds that of variable delay circuit 31. Consequently, switch tube 33 conducts prior to switch tube 36 so that capacitor 34 is always discharged before capacitor 37.

The voltage across capacitor 34 is applied, over lead 40 to one electrode of Pockels Cell 18 while the voltage across capacitor 37 is applied over lead 41 to the other electrode of Pockels Cell. The bias voltage across Pockels Cell 18 is therefore equal to the difference between the voltages on capacitors 34 and 37. Capacitor 34 charges to a positive voltage level, as shown by the plus or minus signs adjacent to the capacitor, through resistor 35 and may typically be in the order of +2,000 or +2,100 volts. Capacitor 37 also charges to a positive voltage, as shown by the plus or minus signs, but to a level which is determined by the ratio of the resistances 38 and 39 forming the voltage divider connected across capacitor 34. That is, capacitor 37 charges through resistor 38 to the voltage existing at the junction of these resistors so that the voltage across capacitor 37 will at all times be less than the voltage across capacitor 34. Thus, for example, the voltage across capacitor 37 may typically be about half that across capacitor 34 or approximately +1,100 volts. Thus, the voltage across the Pockels Cell, for these exemplary values, is initially approximately +1,000 volts with the upper electrode being more positive than the lower electrode. In effect, Pockels Cell 18 has a positive bias voltage of 1,000 volts, which voltage is adequate to produce a phase retardation of $\pi/4$ radians, (i.e., 45°) during each passage of the light through the cell. Since the light must pass through the Pockels Cells twice, because of reflecting mirror 14, the total phase retardation through Pockels Cell with the bias voltage across the cell is $\pi/2$ or a rotation of the light polarization by 90°. This produces maximum loss in the cavity because the polarization of the light is rotated 90° with respect to the light transmission axis of linear polarizer 17.

Capacitors 34 and 37 are selectively discharged by the switching tubes 33 and 36 to reverse the voltage across the Pockels Cell. Each reversal drives the voltage through zero changing the rotation of the light polarization sufficiently to raise the Q of the cavity and produce a light output pulse. The anode 42 of tube 33 is connected through a suitable anode resistor to the junction of resistor 35 and capacitor 34 while its cathode is connected to a point of reference potential such as ground. A keep-alive electrode 44 is connected through a suitable resistor and resistor 35 to the B+ terminal. Similarly, the anode of switching tube 36 is connected through resistor 38 and resistor 35 to the B+ terminal while cathode 46 is connected to ground. A keep-alive electrode 47 is connected through a suitable resistor to the junction of capacitor 37 and resistor 38. Tubes 33 and 36 are normally nonconducting and are controlled by the delayed trigger pulses from variable delay circuit 31 and fixed delay circuit 32 respectively to drive these tubes into conduction to discharge capacitors 34 and 37 to produce the desired voltage reversals across the Pockels Cell.

After the appearance of the trigger pulse at input terminal 30, variable delay circuit 31 produces a time delayed output pulse which is applied to the control grid of switching tube 33 driving the tube into conduction and rapidly discharging capacitor 34 to ground potential so that the voltage on lead 40 and on the upper electrode of the Pockels Cells goes to zero or ground potential. Tube 36, however, remains in a nonconducting state so that the voltage across capacitor 37 which is applied to the lower electrode of the Pockels Cell remains at its original value. As a result, the upper cell electrode instead of being more positive than the lower electrode is now more negative than the lower electrode and in effect, the voltage across Pockels Cell 18 has been reversed. In reversing the voltage across the cell, the cell voltage goes through zero, (i.e., as capacitor discharges, a point is reached when its voltage equals the voltage across capacitor 37) changing the light polarization and raising the Q of the cavity sufficiently to produce a light output pulse from the laser. However, as capacitor 34 continues to discharge and the voltage across it is less than the voltage across capacitor 37, the bias voltage across the cell reverses in polarity and reaches a value sufficient to terminate lasing within the cavity. At a later time, and preferably after pumping of the laser rod has terminated, fixed delay network 32 produces a trigger pulse which is applied to the control grid of switching tube 37 driving the tube into conduction and discharging capacitor 37. As capacitor 37 is discharged, the value of the voltage on the lower electrode goes to zero once again raising the Q of the cavity and resulting in a second light output pulse which also then exhausts all of the remaining energy in the laser.

A second source of biasing voltage A+ is also connected to the upper electrode of the Pockels Cells through a diode 48. Diode 48 is so poled as to be in the nonconducting state as long as the positive voltage across capacitor 34 is greater than A+ and in the conducting state whenever the positive voltage across capacitor 34 falls below A+. Diode 48 and biasing voltage A+ is appled to the Pockels Cell in order to minimize piezo optic effects which interfere with the proper operation of the Pockels Cell when capacitor 37 is discharged and the second light output pulse is produced.

The manner and nature of these piezo optic effects will be discussed in detail subsequently when the wave forms of FIG. 3 are discussed.

Since control of the voltage across the Pockels Cell and hence, the control of the lasing action is dependent on the discharging of capacitors 34 and 37 during each pump interval of laser rod 10, it will be obvious that after capacitor 34 is discharged, it will be necessary to prevent recharging of capacitor 34 until capacitor 37 is discharged. Putting it conversely, it is desirable to charge capacitors 34 and 37 only during the intervals between a pumping of the laser and to discharge these capacitors only during the interval when the laser rod has been pumped by the flash lamp. To this end, a latching circuit 49 is coupled to the outputs of delay circuits 31 and 32 and controls power supply 25 which provides the B+ voltage from which capacitors 34 and 37 are charged. The delayed pulse from variable delay network 31 triggers the latching circuit to produce a voltage at output lead 50 which is of a polarity such as to disable power supply and remove the supply voltage from the B+ terminal. Thus, when switching tube 33 is fired to discharge capacitor 34, capacitor 34 cannot recharge because the power supply has been disabled and the voltage removed from the B+ terminal. The delayed pulse from fixed delay circuit 32 which occurs later in time, again triggers latching circuit 49 to remove the disabling voltage from power supply thereby reapplying the voltage at the B+ terminal. Thus the supply voltage is reapplied only after capacitor 37 has been discharged. Since capacitor 37 is discharged after termination of the flash lamp pulse, it will be apparent that the latching circuit operates to permit the R-C networks to recharge again after each flash lamp pulse is terminated thereby placing the circuit in condition for the next pulsing of the laser.

Figure 3A:
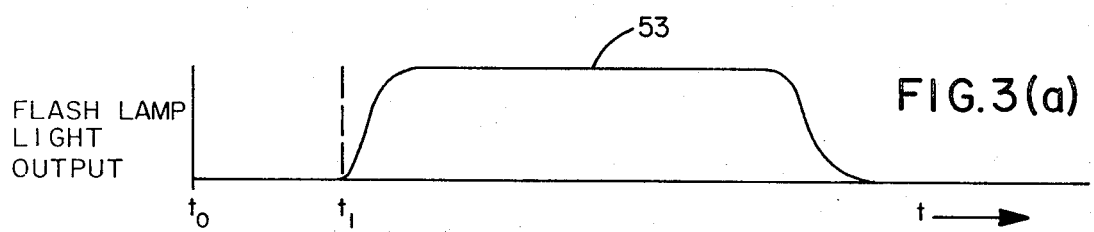
FIGS. 3a–3f are graphs showing the voltage, light and energy distribution relationships existing in various parts of the laser.
Figure 3B:
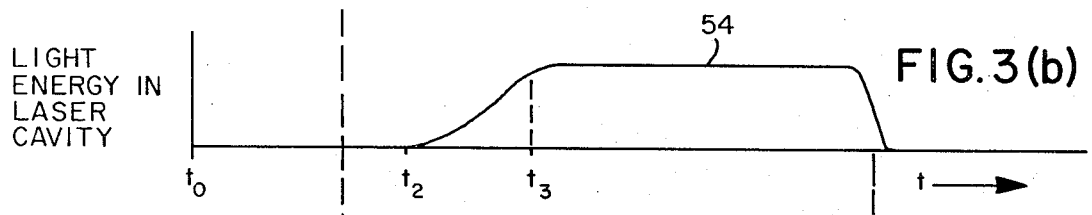
Figure 3C:
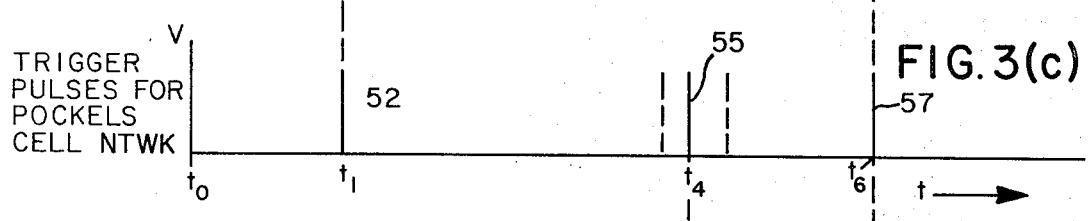
Figure 3D:
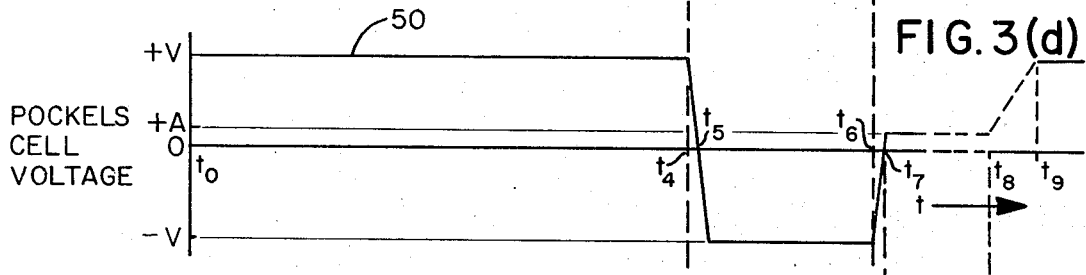
Figure 3E:
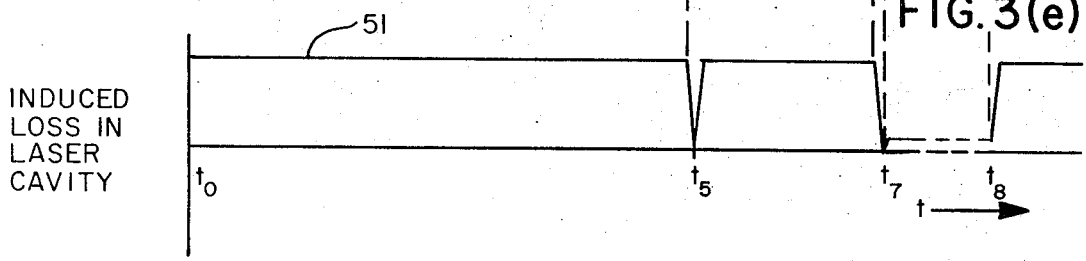

The operation of the multi-pulse Q-switched laser apparatus of the instant invention may be best understood in connection with FIGS. 3a through 3f which illustrate graphically the variations of voltages, energy, etc. with time. At an arbitrary time at $t_0$ i.e., before the trigger pulse generator is actuated, flash lamp power supply 12 and flash lamp 11 are deenergized and as may be seen in FIG. 3a, there is no light output from the lamp to pump laser rod 10. Similarly, in the absence of pumping of the laser rod the light energy in the laser cavity is, as may be seen in FIG. 3b, at a zero or very low level. The voltage across the Pockels Cell, as shown by Curve 50 in FIG. 3d, is however, at a relative positive value since capacitors 37 and 34 are charged to their full voltage thereby establishing a differential voltage +V across the cell. Capacitors 34 and 37 have been charged during the interval since the last pumping of the laser, since as pointed out previously, the supply voltage for these networks is enabled to charge these capacitors upon termination of the flash lamp pumping interval. The +V voltage across the Pockels Cell controls the light polarization so that a high energy loss condition is established within the laser cavity as shown by Curve 51 in FIG. 3e. That is, the polarization of any light passing through the Pockels Cell is rotated by 90° with respect to the polarization axis of linear polarizer 17 so that a minimum amount of light is passed by the polarizer thereby establishing the high loss or low Q condition within the laser cavity.

At time $t_1$ trigger pulse generator 22 produces an output pulse 52 which actuates flash lamp power supply 12 and energizes flash lamp 11 thereby pumping laser rod 10 for a fixed interval. The flash lamp produces a high intensity flash of short duration (several hundred microseconds, for example) as illustrated by Curve 53 in FIG. 3a. The pumping effect produced by the flash lamp produces a delayed light energy buildup in the cavity which is illustrated by Curve 54 of FIG. 3b. That is, the light buildup in the cavity is not instantaneous but is delayed until at time $t_3$ the light energy in the cavity builds up to its maximum value. The time interval $t_3 - t_1$, therefore, determines the minimum amount of delay permitted before actuating the Pockels Cell bias network to produce the first light emission from the laser.

Figure 3F:
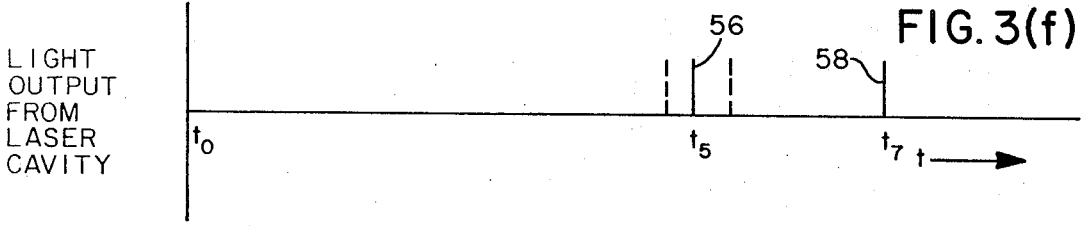

The trigger pulse 52 is, as was pointed out previously, also applied to variable pulse delay network 31 and fixed pulse delay network 32. The output from the variable pulse delay circuit 31 is such as to produce a delayed output pulse 55 at a time $t_4$. The amount of time delay may be varied so that delay pulse 55 may occur earlier or later than the pulse 55 shown in FIG. 3c. The dashed pulses on either side of pulse 55 illustrate schematically that pulse 55 may be varied in time to control the spacing between the two light output pulses from the laser. At $t_4$, pulse 55 triggers switching tube 33 driving it into the conducting state and discharging capacitor 34. As capacitor 34 begins to discharge the voltage across the Pockels Cell begins to change until at $t_5$ the voltage across the cell is zero, as may be seen in FIG. 3d. As the voltage across the cell is reduced, the phase retardation and polarization of the light waves changes and approaches zero at $t_5$. The loss in the laser cavity as illustrated by Curve 51 of FIG. 3e also goes to zero or to a very low value at $t_5$ raising the Q of the cavity sufficiently to produce a light output pulse 56 from the laser as shown in FIG. 3f.

The manner in which discharge of capacitor 37 produces a zero voltage and a voltage reversal across the Pockels Cell may be more easily understood by utilizing the following numerical example. Assume for the moment, that the voltage across capacitor 34 when fully charges is +2,100 volts and the voltage across capacitor 37 is +1,100 volts. Consequently, the upper electrode of Pockels Cell 18 is 1,000 volts more positive than the lower electrode of the Pockels Cell even though both voltages are positive with respect to a point of reference potential. At time $t_4$ when switching tube 33 is triggered, capacitor 34 begins to discharge through the anode-cathode path of the tube and the voltage across capacitor 34 and hence, on the upper electrode of Pockels Cell 18 begins to drop from +2,100 volts towards ground. As the voltage drops the voltage differential across the Pockels Cells is reduced until at $t_5$ the voltage across capacitor 34 reaches +1,100 volts so that the voltage across the cell is zero since both electrodes are now at +1,100 volts. At this point the induced loss in the laser cavity has dropped to zero or a very low value. Consequently, the cavity Q is high and the laser produces an output light pulse 56. As capacitor 34 continues to discharge below +1,100 volts the upper electrode now becomes more negative than the lower electrode thus in effect reversing the voltage across the Pockels Cell until shortly after $t_5$ capacitor 34 is completely discharged so that the upper electrode is now more negative than the lower electrode. When the voltage across capacitor 34 drops below the voltage at the A+ terminal diode 47 begins to conduct and maintains the upper electrode at the A+ voltage which, for example, may be 100 volts so that the voltage differential is now again 1,000 volts but with polarity reversed. With the polarity reversed, the phase delay of the light passing through the cell is again $\pi/2$ radians or 90° rotation of the light polarization so that the induced loss in the cavity again rises to its maximum value as shown by Curve 51 in FIG. 3e.

At $t_6$ fixed delay circuit 32 produces an output trigger pulse 57 which has been delayed by a fixed time interval chosen to exceed the duration of the laser flash lamp output pulse. Trigger pulse 57 is applied to switching tube 36 driving it into conduction and discharging capacitor 37. As capacitor 37 begins to discharge, the voltage across the capacitor and hence, the voltage on the lower electrode of the Pockels Cell is reduced until at $t_7$, as shown on Curve 50 of FIG. 3d, the voltage on the electrode is exactly equal to the A+ voltage applied to the upper electrode. At this point, the voltage across the Pockels Cell is again zero and the loss in the laser cavity drops to zero as shown by Curve 51 of FIG. 3e. This raises the Q of the laser cavity sufficiently to produce a second light output pulse 58 which removes or "dumps" the remaining light energy in the laser cavity. As capacitor 37 continues to discharge below the 100 volts, i.e., until it discharges completely to zero volts, a positive voltage equal to the A+ voltage is applied across the Pockels Cell as shown in FIG. 3d. This low level reverse biasing voltage is applied to the Pockels Cell after the second pulsing to counteract piezo optic effects on the Pockels Cells which result from the stresses on the crystal produced by the bias voltage on the lithium niobate crystal. These piezo optic effects, if not counteracted by means of a further biasing voltage interfere with the ability of the Pockels Cell to operate properly. For a further discussion of this effect in a Q-switching laser, reference is hereby made to an article entitled:

Transient Elasto-Optic Effects and Q-Switching Performance in Lithium Niobate and KD*P Pockels Cells By: R.P. Hilbert and W.R. Hook, Applied Optics, Vol. 9 Pages 1939–1940 — 1970

After termination of the flash lamp pumping and the occurrence of the second light output pulse 58 at $t_7$ which drains the laser cavity of all its residual energy, the Pockels Cell biasing network is restored to a condition in which lasing may again take place. That is, the delayed trigger pulse 57 which produced the second light output pulse is also applied to latching circuit 49 which had previously disabled the power supply for network 24. The latching circuit reverses its state and as a result, the power supply circuit is enabled and a positive D-C supply voltage is again supplied to the B+ terminal which supplies the two R-C circuits. Thus, at $t_8$ capacitors 34 and 37 begin to charge again through resistors 35 and 38 respectively until at $t_9$ as determined by the time constants of these two networks, the bias voltage for the Pockels Cell is again raised to the +V level thereby establishing a lossy condition in the laser cavity which reduces the Q sufficiently to inhibit any lasing of rod 10 when the next flash lamp pulse is produced. The next flash lamp pulse produces the same sequence of events just described to produce two very short output light pulses which may be separated by a variable time interval.

It will be apparent from the above discussion that a novel Q-switched circuit arrangement has been produced in which two variably spaced output light pulses may be produced during each light pumping interval of the laser utilizing but a single laser and a single laser power supply and simple R-C circuitry Although a particular embodiment of this invention has been shown it will, of course, be understood that the invention is not limited thereto since many modifications both as to the arrangements and the components utilized therein may be made. It is contemplated by the appended claims to cover any such modifications which fall within the true spirit and scope of this invention.

What is claimed as new and desired to be secured by U.S. Letters Patent:
1. A multiple pulse Q-switched laser comprising
   a. Means defining a laser cavity,
   b. A laserable material disposed in said cavity,
   c. Means for pumping said laserable material for a given interval,
   d. A light polarizer disposed in said cavity, said polarizer passing light radiation having one polarization direction and attenuating light radiation having another polarization direction,
   e. An electro-optical light polarizing element for altering the direction of polarization from said one direction to said other direction in accordance with a voltage applied across said element,
   f. Means for initially applying a first unidirectional voltage of one polarity to said electro-optical light polarizing element for altering the direction of polarization to said other direction to lower the Q of said cavity and prevent lasing,
   g. Means to reverse the polarity of said unidirectional voltage across said electro-optical element after pumping of said laserable material has been initiated thereby causing the voltage across said electro-optical element to go through zero and alter the direction of polarization to said one direction to raise the cavity Q and produce a first output light pulse and thereafter return the direction of polarization to said other direction to terminate lasing.
   h. Means for subsequently removing the voltage of reverse polarity to raise the cavity Q again and produce a second output light pulse for each pumping interval.

2. The multiple pulse Q-switched laser according to claim 1 including means for varying the interval between said output light pulses.

3. The multiple pulse Q-switched laser according to claim 1 wherein said electro-optical element is a Pockels Cell.

4. The multiple pulse Q-switched laser according to claim 1 wherein the means for applying said first voltage includes two sources of unidirectional voltage of the same polarity and of different magnitudes which are both applied to said electro-optical element to establish a voltage across said element of one relative polarity and of a magnitude equal to the difference in magnitudes between the voltages from said sources, and means to remove the larger of said voltages to reverse the relative polarity of the voltage across said electro-optical element to produce the first light pulse and subsequently to remove the other of said voltages to produce the second light pulse.

5. The multiple pulse Q-switched laser according to claim 4 wherein said voltage sources include storage capacitors which are charged to voltage levels of different magnitudes, the storage capacitors in each source being connected to opposite electrodes of said electro-optical element to establish a voltage thereacross of one relative polarity of a magnitude equal to the difference in the voltage levels across said capacitors.

6. The multiple pulse Q-switched laser according to claim 5 wherein the means to remove the voltages from said electro-optical element include switch means coupled to said capacitors and means to actuate said switch means in a predetermined sequence to discharge said capacitors.

7. The multiple pulse Q-switched laser according to claim 6 in which said switch means comprises a plurality of discharge tubes having their anode-cathode paths connected across said capacitors and means to trigger said discharge tubes.

8. The multiple pulse Q-switch according to claim 7 wherein the means to trigger said discharge tubes in a predetermined sequence includes delay means coupled to said switching tubes, means to impress a signal on said delay means in response to the initiation of pumping of said laserable material to produce triggering pulses having different delay times for said switching tubes.

* * * * *